(12) United States Patent
Sakai

(10) Patent No.: US 7,961,403 B2
(45) Date of Patent: Jun. 14, 2011

(54) ZOOM LENS AND IMAGE PICKUP APPARATUS INCLUDING THE SAME

(75) Inventor: Hideki Sakai, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/843,533

(22) Filed: Jul. 26, 2010

(65) Prior Publication Data

US 2011/0026134 A1 Feb. 3, 2011

(30) Foreign Application Priority Data

Aug. 3, 2009 (JP) ................................. 2009-180539

(51) Int. Cl.
*G02B 15/14* (2006.01)
(52) U.S. Cl. .................................................... 359/687
(58) Field of Classification Search .................. 359/687
See application file for complete search history.

(56) References Cited

U.S. PATENT DOCUMENTS

| | | | |
|---|---|---|---|
| 6,594,087 B2 | 7/2003 | Uzawa et al. | |
| 6,975,461 B2 | 12/2005 | Eguchi | |
| 7,206,137 B2 | 4/2007 | Nakatani et al. | |
| 7,830,612 B2 * | 11/2010 | Hagiwara | ................ 359/676 |

* cited by examiner

*Primary Examiner* — William C Choi
(74) *Attorney, Agent, or Firm* — Canon U.S.A., Inc. I.P. Division

(57) ABSTRACT

A zoom lens includes a first lens unit having a positive refractive power, a second lens unit having a negative refractive power, a third lens unit having a positive refractive power, and a rear group including at least one lens unit. The first lens unit, the second lens unit, the third lens unit, and the rear group are arranged in order from an object side to an image side. The second and third lens units move for zooming. Imaging magnifications of the second lens unit at a wide angle end and a telephoto end, imaging magnifications of the third lens unit at the wide angle end and the telephoto end, a moving amount of the third lens unit along an optical axis during zooming from the wide angle end to the telephoto end, and a total lens length at the telephoto end are set based on predetermined conditions.

13 Claims, 10 Drawing Sheets

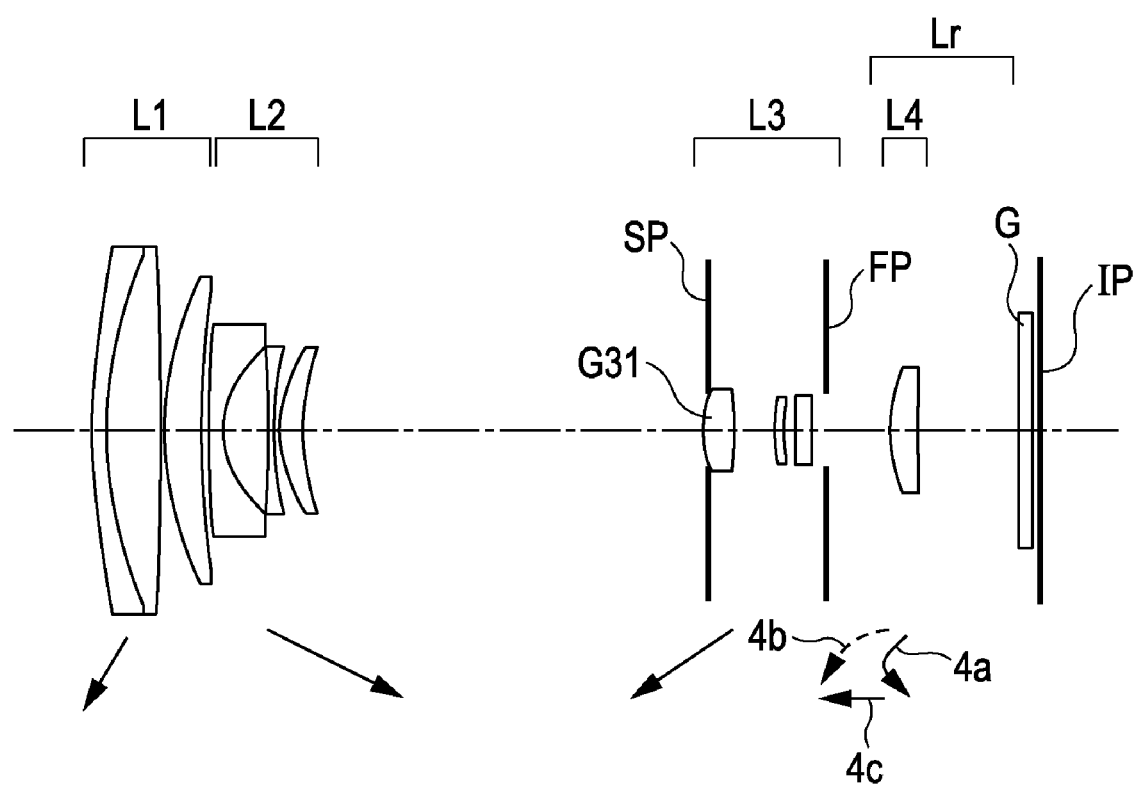

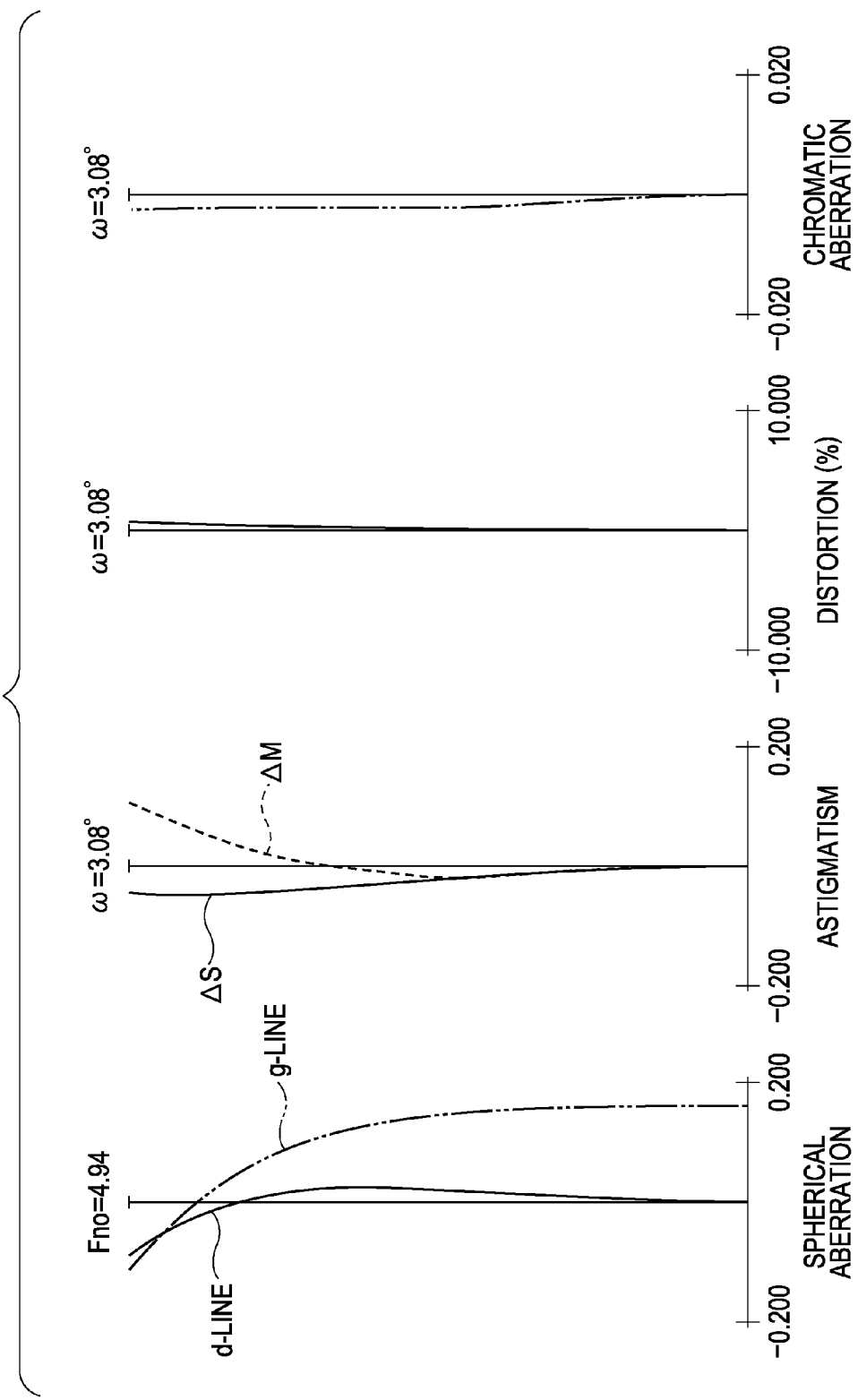

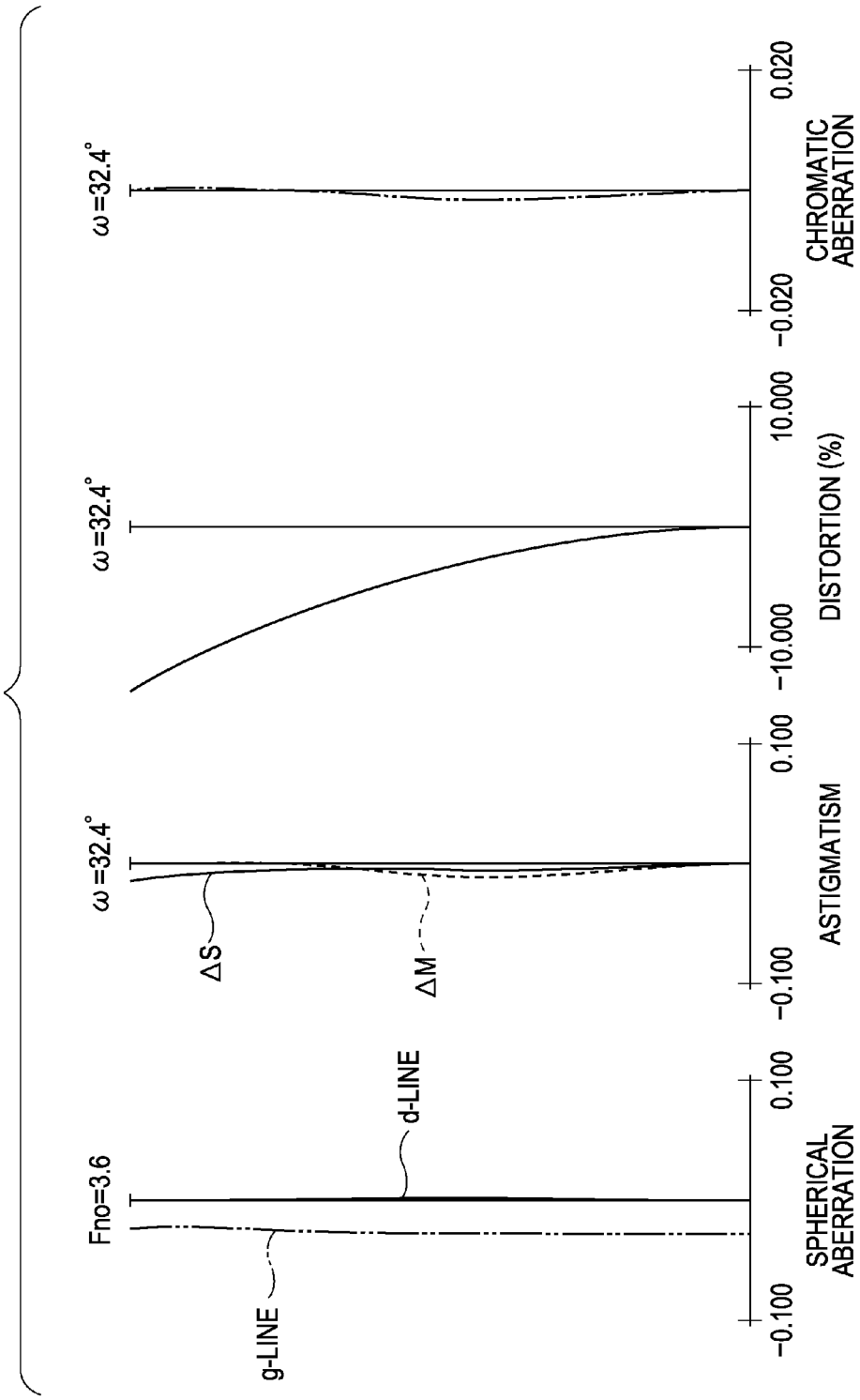

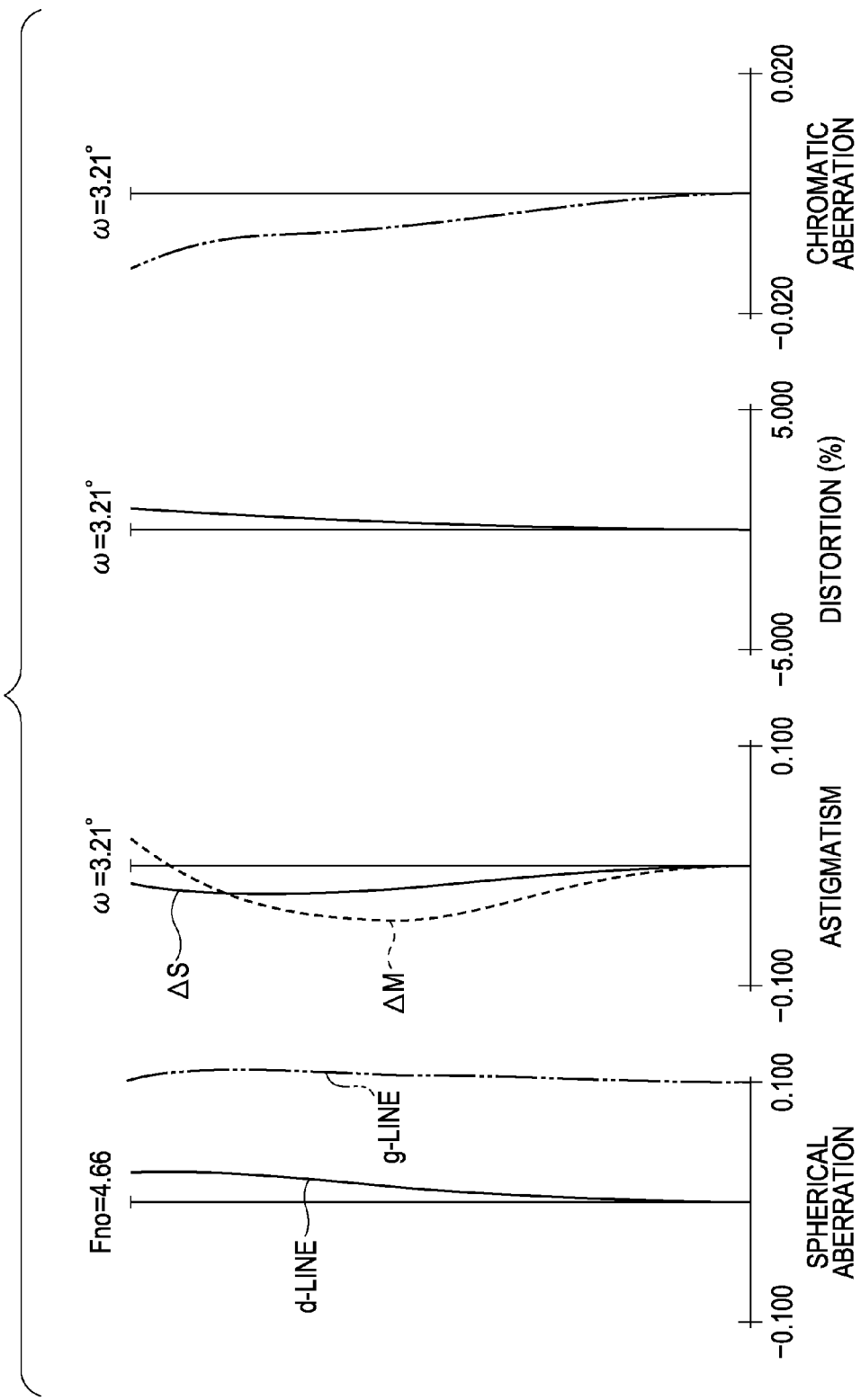

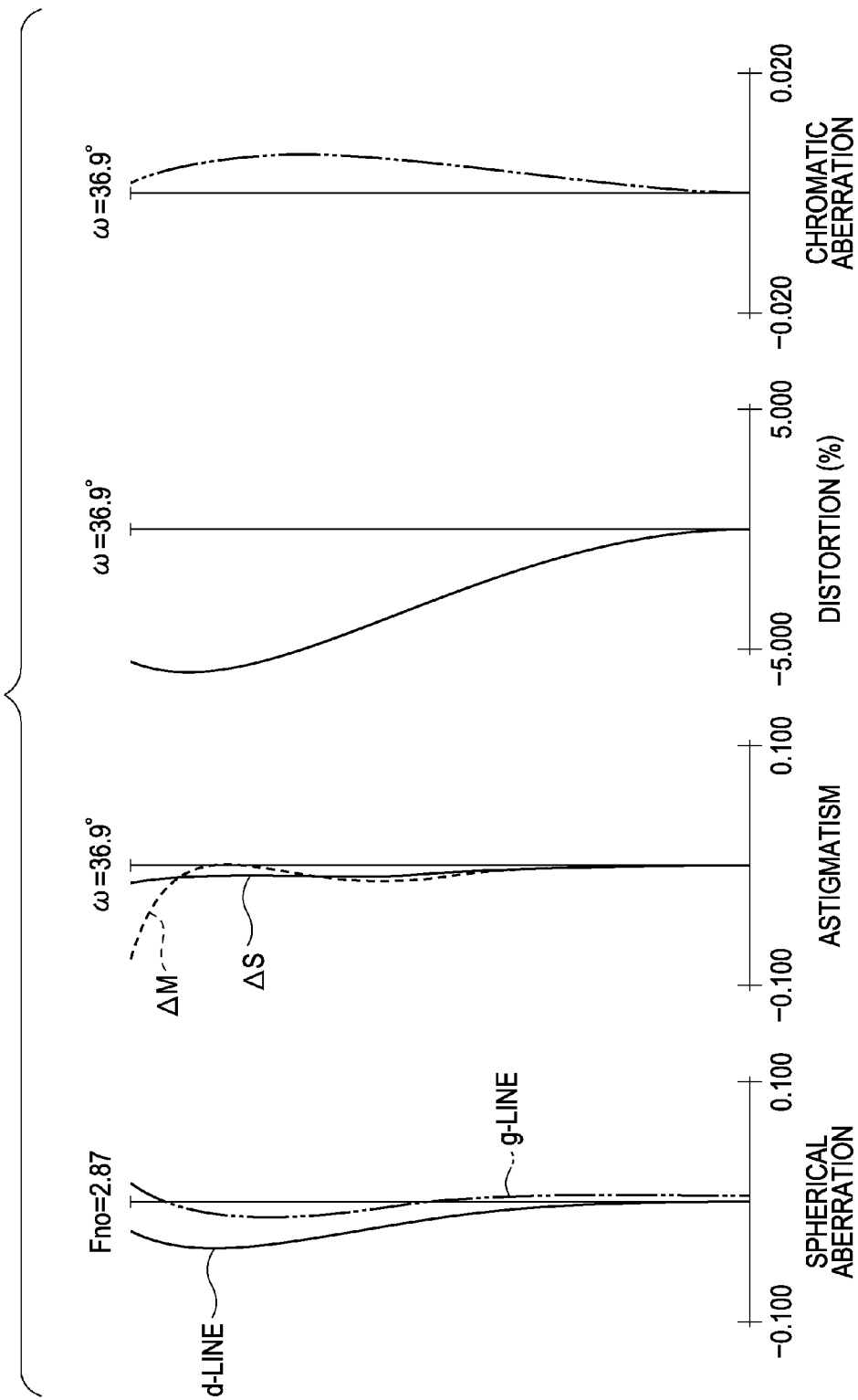

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens, and more particularly, to a zoom lens suitable for use in an image pickup apparatus using a solid-state image pickup element such as a video camera, an electronic still camera, a broadcast camera, or a surveillance camera, or an image pickup apparatus such as a camera using a silver-halide film.

2. Description of the Related Art

Image pickup apparatuses with increased functionality and decreased size have proliferated in recent years. An imaging optical system for use in such an image pickup apparatus generally requires a zoom lens having a compact size, a high zoom ratio, and a high resolving power.

A positive lead type zoom lens is known in which a first lens unit having a positive refractive power, a second lens unit having a negative refractive power, a third lens unit having a positive refractive power, and a rear group having at least one lens unit are arranged in order from an object side to an image side. For purposes of the following description, the side of a lens where an object to be imaged is placed is called the object side or front side of the lens; and the side of the lens where the image is formed is called the image side or back side of the lens.

In one example of a positive lead type zoom lens, first to fourth lens units respectively having positive, negative, positive, and positive refractive powers are arranged in order from the object side to the image side.

U.S. Pat. No. 6,975,461 discloses a compact zoom lens that is suitable as a telescopic zoom lens. U.S. Pat. No. 7,206,137 discloses a zoom lens having a high zoom ratio of 15 or more. U.S. Pat. No. 6,594,087 discloses a zoom lens in which five lenses respectively having positive, negative, positive, negative, and positive refractive powers are arranged in order from the object side to the image side.

To obtain a zoom lens having a high zoom ratio and a compact size, in general, the number of lenses is reduced while increasing the refractive powers of lens units that constitute the zoom lens. In such a zoom lens, however, aberration variation due to zooming increases, and errors due to tilting and eccentricity of the lenses and lens units during assembly increase.

To achieve a high optical performance of a positive lead type four- or five-unit zoom lens while ensuring a high zoom ratio and a compact lens system, it is important to appropriately set the moving parameters of the lens units for zooming.

In particular, to properly correct aberrations, such as coma aberration and curvature of field, over the entire zoom range while ensuring a compact size of the camera, it is important to appropriately set the moving parameters of the second and third lens units during zooming.

SUMMARY OF THE INVENTION

A zoom lens according to an aspect of the present invention includes a first lens unit having a positive refractive power; a second lens unit having a negative refractive power; a third lens unit having a positive refractive power; and a rear group including at least one lens unit. The first lens unit, the second lens unit, the third lens unit, and the rear group are arranged in order from an object side to an image side. The second lens unit and the third lens unit move for zooming. The following conditions are satisfied:

$$3.00 < (\beta 2t \times \beta 3w)/(\beta 2w \times \beta 3t) < 5.85$$

$$-0.50 < M3/Lt < -0.10$$

where $\beta 2w$ and $\beta 2t$ represent imaging magnifications of the second lens unit at a wide angle end and a telephoto end, $\beta 3w$ and $\beta 3t$ represent imaging magnifications of the third lens unit at the wide angle end and the telephoto end, M3 represents a moving amount of the third lens unit along an optical axis during zooming from the wide angle end to the telephoto end, and Lt represents a total lens length of the zoom lens at the telephoto end.

According to the present invention, it is possible to realize a zoom lens having a compact optical system, a high zoom ratio, and a high optical performance over the entire zoom range.

Further features of the present invention will become apparent to persons of ordinary skill in the art from the following description of exemplary embodiments with reference to the attached drawings.

BRIEF DESCRIPTION OF THE DRAWINGS

FIG. 1 is a lens cross-sectional view at a wide angle end according to a first embodiment of the present invention.

FIGS. 2A and 2B are aberration diagrams of the first embodiment at the wide angle end and a telephoto end.

FIGS. 4A and 4B are aberration diagrams of the second embodiment at the wide angle end and a telephoto end.

FIGS. 6A and 6B are aberration diagrams of the third embodiment at the wide angle end and a telephoto end.

DESCRIPTION OF THE EMBODIMENTS

In a zoom lens of the present invention, a first lens unit having a positive refractive power, a second lens unit having a negative refractive power, a third lens unit having a positive refractive power, and a rear group including at least one lens unit are arranged in order from an object side to an image side. During zooming, at least the second and third lens units move.

Figure 2A:
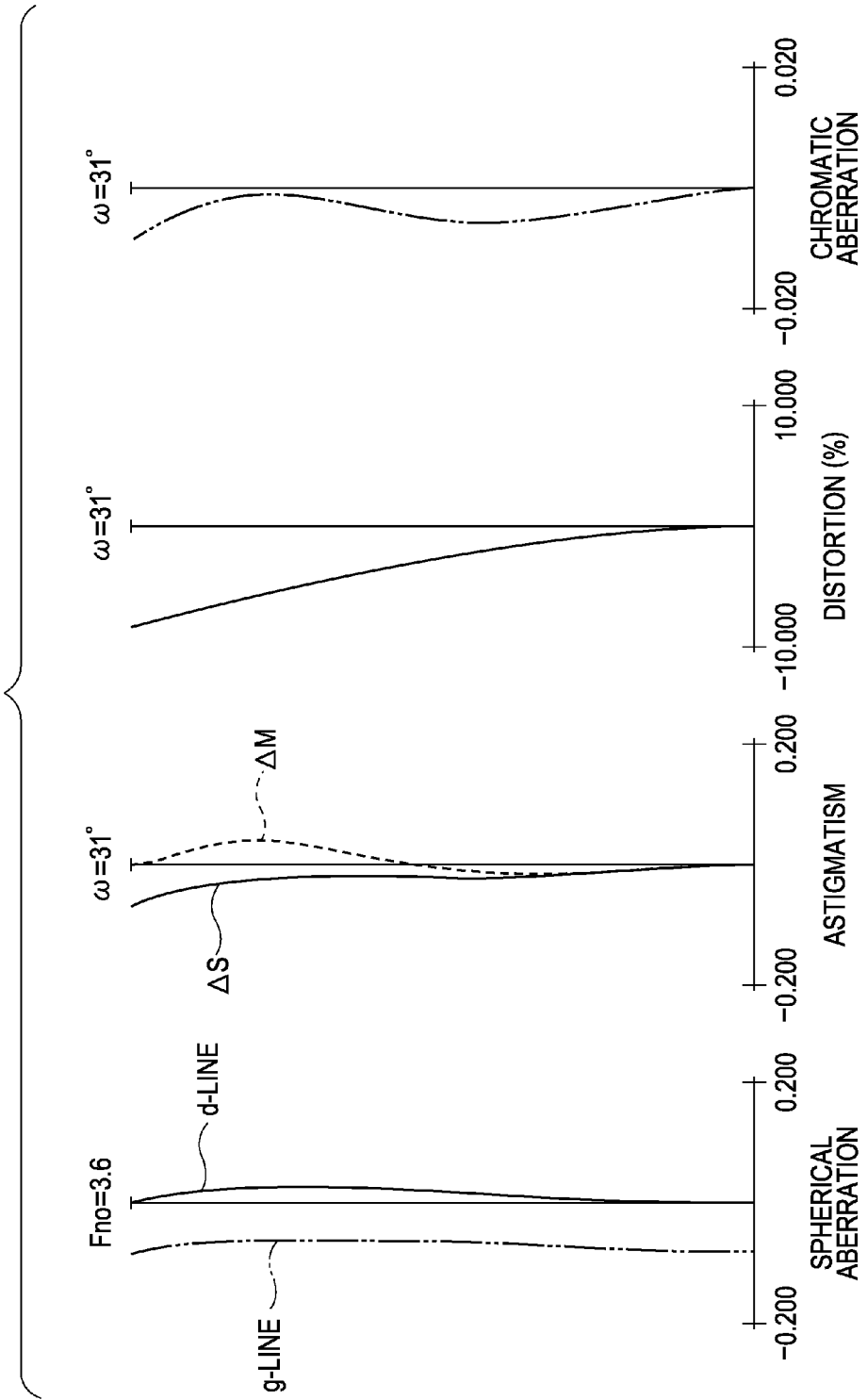
Figure 3:
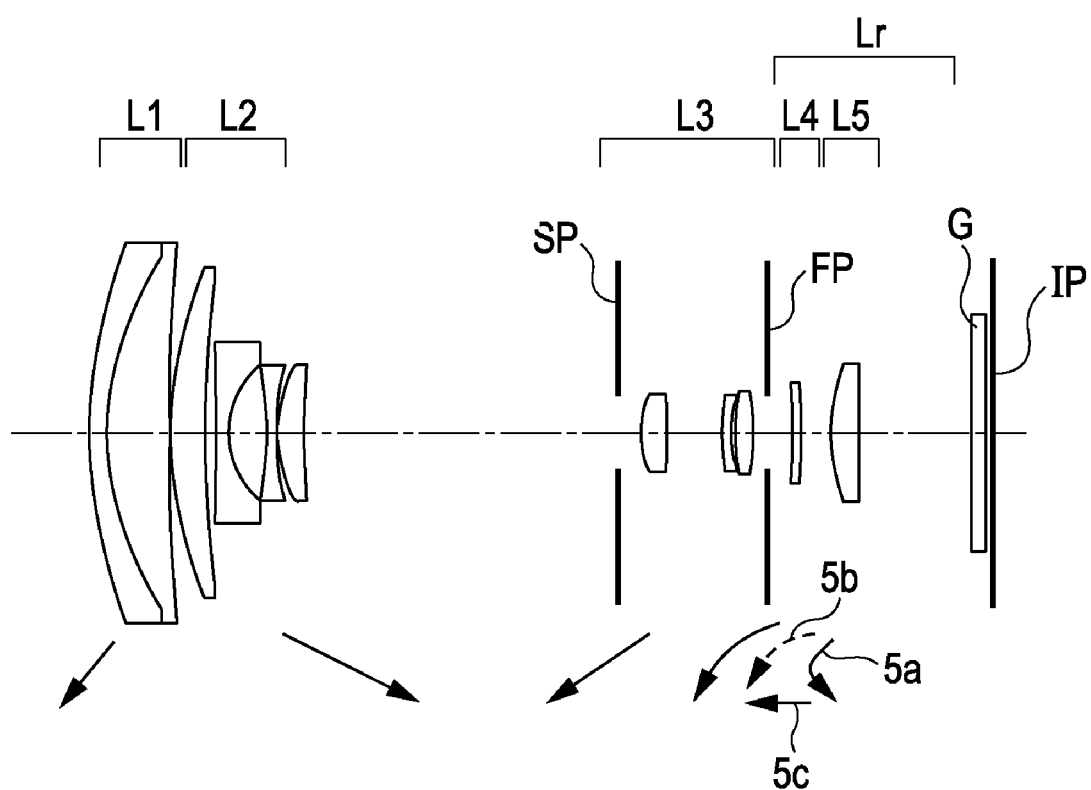
FIG. 3 is a lens cross-sectional view at a wide angle end according to a second embodiment of the present invention.
Figure 5:
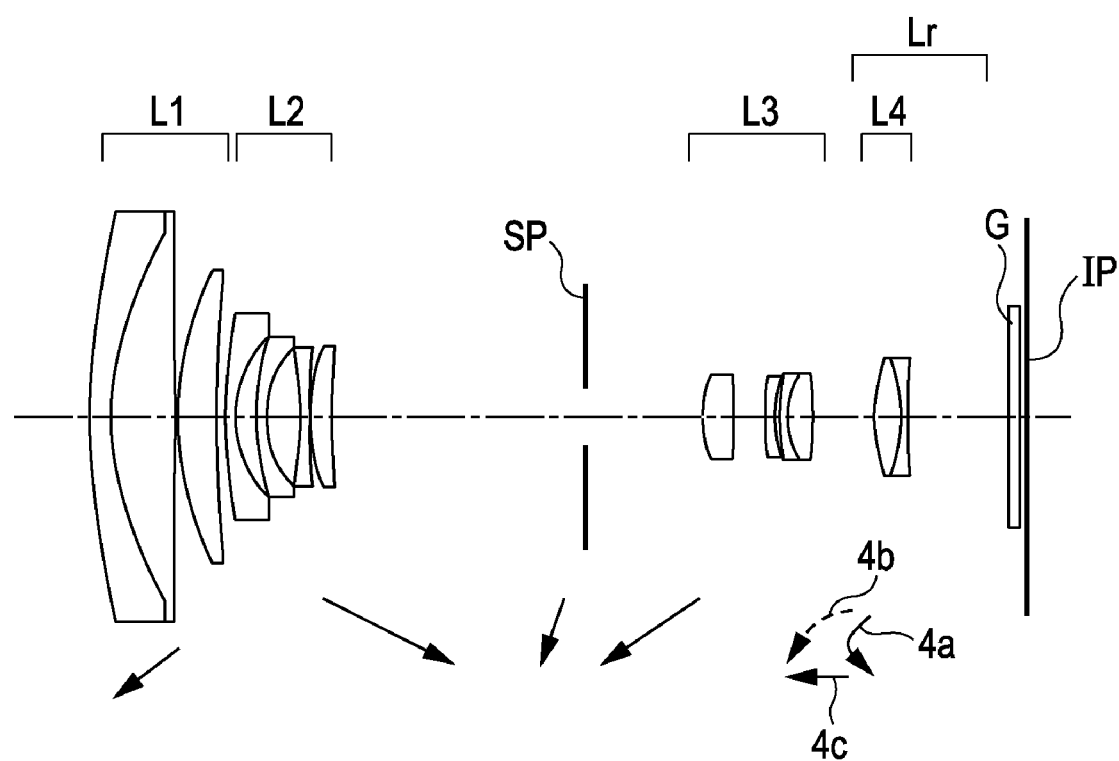
FIG. 5 is a lens cross-sectional view at a wide angle end according to a third embodiment of the present invention.
Figure 6B:
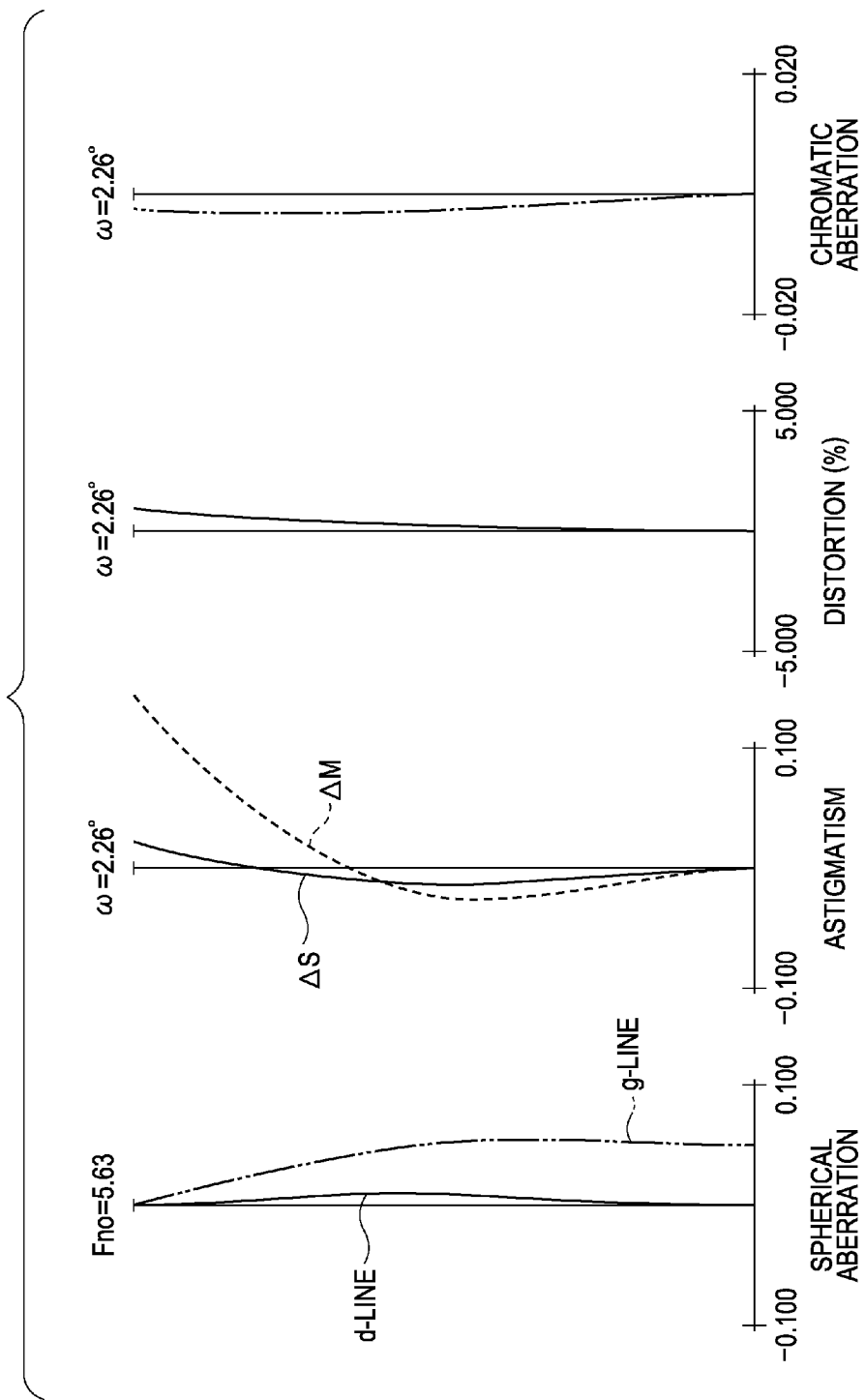
Figure 7:
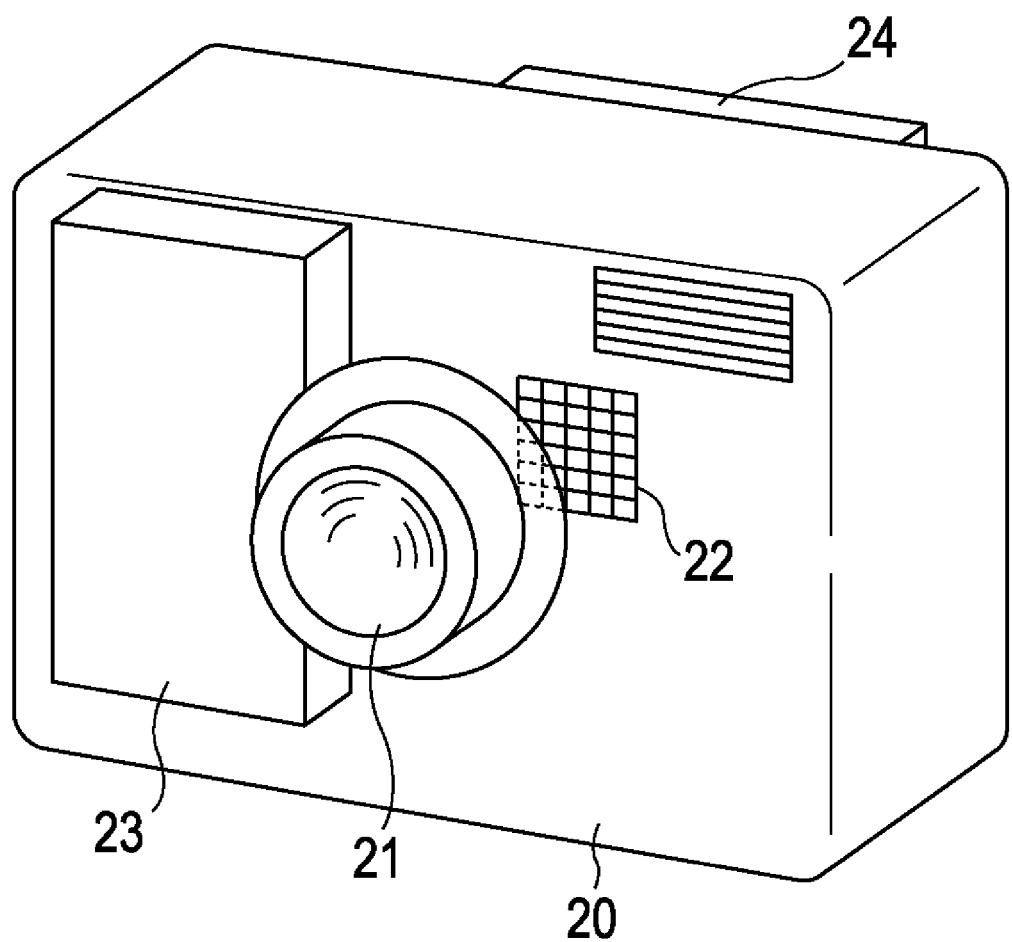
FIG. 7 is a schematic view illustrating the principal part of an image pickup apparatus of the present invention.

FIG. 1 is a lens cross-sectional view of a zoom lens at a wide angle end (short focal-length end) according to a first embodiment of the present invention. FIGS. 2A and 2B are aberration diagrams of the zoom lens of the first embodiment at the wide angle end and a telephoto end (long focal-length end). FIG. 3 is a lens cross-sectional view of a zoom lens at a wide angle end according to a second embodiment of the present invention. FIGS. 4A and 4B are aberration diagrams of the zoom lens of the second embodiment at the wide angle end and a telephoto end. FIG. 5 is a lens cross-sectional view of a zoom lens at a wide angle end according to a third embodiment of the present invention. FIGS. 6A and 6B are aberration diagrams of the zoom lens of the third embodiment at the wide angle end and a telephoto end. FIG. 7 is a schematic view illustrating the principal part of a camera (image pickup apparatus) including the zoom lens of the present invention.

The zoom lenses of the embodiments are imaging lens systems for use in image pickup apparatuses such as a video camera, a digital camera, a TV camera, and a silver-halide film camera.

In the lens cross-sectional views, the left side is an object side (front side), the right side is an image side (rear side), i represents the order number of the lens unit from the object side, Li represents an i-th lens unit, and Lr represents a rear group including at least one lens unit.

Referring to the lens cross-sectional views of the first and third embodiments shown in FIGS. 1 and 5, the zoom lens includes a first lens unit L1 having a positive refractive power, a second lens unit L2 having a negative refractive power, a third lens unit L3 having a positive refractive power, and a rear group Lr. The rear group Lr is formed by a fourth lens unit L4 having a positive refractive power. Each of the zoom lenses of the first and third embodiments is a positive lead type four-unit zoom lens including four lens units.

Referring to the lens cross-sectional view of the second embodiment shown in FIG. 3, the zoom lens includes a first lens unit L1 having a positive refractive power, a second lens unit L2 having a negative refractive power, a third lens unit L3 having a positive refractive power, and a rear group Lr. The rear group Lr is formed by a fourth lens unit L4 having a negative refractive power and a fifth lens unit L5 having a positive refractive power. The zoom lens of the second embodiment is a positive lead type five-unit zoom lens including five lens units.

In the embodiments, an f-number determining stop SP (aperture stop) determines an open f-number (Fno) light beam, and is provided on an object side of the third lens unit L3 or in the third lens unit L3. A flare cut stop FP is provided on an image side of the third lens unit L3 so as to block unnecessary light. An optical block G corresponds to an optical filter, a face plate, a crystal low-pass filter, or an infrared cut-off filter. An image plane IP corresponds to an image pickup surface of a solid-state image pickup element (photoelectric conversion element), such as a CCD sensor or a CMOS, when the zoom lens is used as an imaging optical system of a video camera or a digital still camera, and to a film surface when the zoom lens is used in a silver-halide film camera.

In the aberration diagrams, d and g respectively represent a d-line and a g-line, and ΔM and ΔS respectively represent a meridional image plane and a sagittal image plane. Lateral chromatic aberration is represented by the g-line, ω represents the half angle of view (half of the imaging angle of view), and Fno represents the f-number.

In the following embodiments, the wide angle end and the telephoto end refer to zoom positions provided when the lens unit for zooming is positioned at opposite ends of a mechanical movable range on the optical axis. In the embodiments, the lens units move during zooming from the wide angle end to the telephoto end, as shown by arrows in the figures.

In the first embodiment shown in FIG. 1, during zooming from the wide angle end to the telephoto end, the first lens unit L1 moves to the object side, the second lens unit L2 moves to the image side, and the third lens unit L3 moves to the object side, as shown by the dark solid arrows. The fourth lens unit L4 moves to the object side along a convex path. The aperture stop SP and the flare cut stop FP move together with the third lens unit L3. Further, a rear focus method in which focusing is performed by moving the fourth lens unit L4 along the optical axis is adopted. Focusing from an object at infinity to a near object at the telephoto end is performed by moving the fourth lens unit L4 forward, as shown in arrow 4c in the lens cross-sectional view. A solid curve 4a and a dotted curve 4b relating to the fourth lens unit L4 indicate moving paths along which the fourth lens unit L4 moves to correct image plane variation due to zooming from the wide angle end to the telephoto end while the focus is on the object at infinity and the near object, respectively. In addition, a blur of a taken image due to vibration (tilting) of the entire optical system (zoom lens) is corrected by moving the third lens unit L3 having a positive refractive power in a direction perpendicular to the optical axis.

In the second embodiment shown in FIG. 3, during zooming from the wide angle end to the telephoto end, the first lens unit L1 moves to the object side, the second lens unit L2 moves to the image side, the third lens unit L3 moves to the object side, and the fourth lens unit L4 moves to the object side, as shown by the arrows. The fifth lens unit L5 moves to the object side along a convex path. The aperture stop SP and the flare cut stop FP move together with the third lens unit L3. Further, a rear focus method in which focusing is performed by moving the fifth lens unit L5 along the optical axis is adopted. Focusing from an object at infinity to a near object at the telephoto end is performed by moving the fifth lens unit L5 forward, as shown by arrow 5c in the lens cross-sectional view. A solid curve 5a and a dotted curve 5b relating to the fifth lens unit L5 indicate moving paths along which the fifth lens unit L5 moves to correct image plane variation due to zooming from the wide angle end to the telephoto end while the focus is on the object at infinity and the near object. In addition, a blur of a taken image due to vibration (tilting) of the entire optical system (zoom lens) is corrected by moving the third lens unit L3 having a positive refractive power in a direction perpendicular to the optical axis.

The zoom lens of the third embodiment shown in FIG. 5 is different from the zoom lens of the first embodiment shown in FIG. 1 in that the aperture stop SP moves independently of the third lens unit L3 during zooming, in that the flare cut stop FP is not provided, and in the lens configurations of the second lens unit L2, the third lens unit L3, and the fourth lens unit L4. Other structures are the same as those adopted in the first embodiment.

In the zoom lenses of the embodiments, the first lens unit L1 having a positive refractive power, the second lens unit L2 having a negative refractive power, the third lens unit L3 having a positive refractive power, and the rear group Lr including at least one lens unit are arranged in order from the object side to the image side. Zooming is performed by moving the second lens unit L2 and the third lens unit L3. Further, the zoom ratios of the second lens unit L2 and the third lens unit L3 are appropriately set and the moving amount of the third lens unit L3 is increased, so that a compact zoom lens having a high zoom ratio is obtained.

More specifically, the following conditions are satisfied:

$$3.00 < (\beta 2t \times \beta 3w)/(\beta 2w \times \beta 3t) < 5.85 \quad (1)$$

$$-0.50 < M3/Lt < -0.10 \quad (2)$$

where $\beta 2w$ and $\beta 2t$ represent imaging magnifications of the second lens unit L2 at the wide angle end and the telephoto end, $\beta 3w$ and $\beta 3t$ represent imaging magnifications of the third lens unit L3 at the wide angle end and the telephoto end, M3 represents a moving amount of the third lens unit L3 along the optical axis during zooming from the wide angle end to the telephoto end, and Lt represents a total lens length of the zoom lens at the telephoto end.

Here, the total lens length refers to the sum of the distance between the foremost lens surface to the final lens surface, and the back focus as an equivalent air length from the final lens surface to the image plane between which the optical block is provided. The sign of the moving amount M3 is negative when the third lens unit L3 is located closer to the object side at the telephoto end than at the wide angle end, and is positive when the third lens unit L3 is located closer to the image side at the telephoto end than at the wide angle end. This also applies to the moving amounts of the other lens units.

Conditional Expression (1) satisfies the share of zooming function of the second lens unit L2 and the third lens unit L3. Since the stop SP is provided near the third lens unit L3 in the embodiments, the difference in the distance from the optical axis is large between an upper line and a lower line of a peripheral light beam entering the periphery of the surface of the third lens unit L3. For this reason, when the value falls below the lower limit in Conditional Expression (1), the share of zooming of the third lens unit L3 increases, and the radius of curvature of each lens surface of the third lens unit L3 decreases, it is difficult to correct coma aberration over the entire zoom range. In contrast, since the second lens unit L2 is relatively far from the stop SP, the peripheral light beam passes through the peripheral portion of the lens at the wide angle end and passes through the center portion at the telephoto end. For this reason, when the value exceeds the upper limit in Conditional Expression (1) and the share of zooming of the second lens unit L2 increases, the difference in angle of incidence of the entire peripheral light beam on the refracting surface in the second lens unit L2 is large between the wide angle end and the telephoto end. In this case, curvature of field due to zooming greatly changes, and it is therefore difficult to properly correct the curvature of field over the entire zoom range. When the value is within the range defined in Conditional Expression (1), the above-described problems rarely occur. Hence, there is no need to add any new lens to the second lens unit L2 and the third lens unit L3 in order to increase the radii of curvature of the lens surfaces. This reduces the number of lenses in the lens units, and achieves a compact size and a high optical performance.

When the value falls below the lower limit in Conditional Expression (2) and the moving amount of the third lens unit L3 increases, the distances of the upper line and the lower line of the peripheral light beam from the optical axis greatly differ between the wide angle end and the telephoto end in the third lens unit L3. For this reason, it is difficult to correct coma aberration over the entire zoom range. In contrast, when the value exceeds the upper limit in Conditional Expression (2), in order to maintain a high magnification of the third lens unit L3, the object point of the third lens unit L3 needs to be changed by increasing the moving amount of the second lens unit L2. However, if the moving amount of the second lens unit L2 excessively increases, the angle of incidence of the entire peripheral light beam on the refracting surface of the second lens unit L2 greatly differs between the wide angle end and the telephoto end. In this case, variation in curvature of field during zooming increases, and it is therefore difficult to properly correct the curvature of field over the entire zoom range.

In the embodiments, it is more preferable to set the numerical ranges in Conditional Expressions (1) and (2) as follows:

$$3.20 < (\beta_{2t} \times \beta_{3w})/(\beta_{2w} \times \beta_{3t}) < 5.40 \quad (1a)$$

$$-0.20 < M3/Lt < -0.11 \quad (2a)$$

By forming the lens units, as described above, a zoom lens having a high optical performance and a high zoom ratio is obtained. It is more preferable to satisfy at least one of the following conditions:

$$-0.3 < M1/Lw < -0.05 \quad (3)$$

$$7.0 < Lw/fw < 14.0 \quad (4)$$

where M1 represents the moving amount of the first lens unit L1 along the optical axis during zooming from the wide angle end to the telephoto end, Lw represents the total length at the wide angle end, and fw represents the focal length of the entire system at the wide angle end.

When the value falls below the lower limit in Conditional Expression (3) and the moving amount of the first lens unit L1 to the object side increases, the total lens length increases at the telephoto end, and this increases the thickness of the zoom lens in a retracted state. In contrast, when the value exceeds the upper limit in Conditional Expression (3) and the moving amount of the first lens unit L1 to the object side decreases, the total lens length increases at the wide angle end, and the front-lens effective diameter increases undesirably.

In the embodiments, it is more preferable to set the numerical range in Conditional Expression (3) as follows:

$$-0.18 < M1/Lw < -0.09 \quad (3a)$$

When the value falls below the lower limit in Conditional Expression (4), the total lens length with respect to the focal length at the wide angle end becomes too short. As a result, it is difficult to arrange a plurality of lenses necessary for aberration correction, and to maintain a sufficient optical performance. In contrast, when the value exceeds the upper limit, the total lens length at the wide angle end becomes too long, and the front-lens effective diameter increases. It is therefore difficult to reduce the total size of the zoom lens.

In the embodiments, it is more preferable to set the numerical range in Conditional Expression (4) as follows:

$$10.0 < Lw/fw < 12.0 \quad (4a)$$

In addition, preferably, a lens G31 closest to the object side in the third lens unit L3 has a convex lens surface on the object side. Further, the f-number determining stop for determining the open f-number light beam is preferably provided between the object-side vertex of the lens G31 and an intersection of the object-side lens surface of the lens G31 and an outer peripheral portion. Since this eliminates the necessity of placing a stop member separately from the third lens unit L3, the distance between the second lens unit L2 and the third lens unit L3 at the telephoto end can be easily reduced, and the moving amount of the third lens unit L3 during zooming can be increased. As a result, Conditional Expression (2) is satisfied easily.

Preferably, the first lens unit L1 is formed by three lenses. This reduces chromatic aberration at the telephoto end, and also prevents the number of lenses in the first lens unit L1 from excessively increasing. As a result, it is easy to reduce the total lens length and the front-lens effective diameter Preferably, all lenses included in the second lens unit L2 are spherical. This allows the lenses to be easily worked by polishing, and realizes a high mass productivity.

Preferably, the third lens unit L3 includes at least one aspherical lens surface. This allows effective correction of spherical aberration and coma aberration.

Preferably, the third lens unit L3 moves in a manner such as to have a component in a direction perpendicular to the optical axis in order to shift the imaging position, that is, to perform image stabilization. In this case, a motion blur can be suppressed without adding any prism or lens unit for image stabilization. Although it is preferable to move the third lens unit L3 in view of the moving amount in the direction perpendicular to the optical axis, the third lens unit L3 does not always need to be entirely moved, but may be partly moved. Further preferably, the zoom lenses of the embodiments are mounted in an image pickup apparatus capable of forming and recording an image in a solid-state image pickup element.

In an image pickup apparatus including the zoom lens of the present invention, it is preferable that the effective image circle diameter serving as an area where an image is recorded be smaller at the wide angle end than at the telephoto end. Since this limits the height of the light beam on the peripheral surface portion at the wide angle end, the front-lens effective diameter can be reduced easily. However, in a zoom lens that is not required to have a smaller front-lens effective diameter and a sufficient light quantity in the peripheral surface portion, the effective image circle diameter may not be smaller at the wide angle end than at the telephoto end.

Next, a description will be given of the configurations of the lens units in the embodiments.

In the zoom lenses of the embodiments, the first lens unit L1 includes, in order from the object side to the image side, a cemented lens of negative and positive meniscus lenses each having a convex surface on the object side, and a positive meniscus lens having a convex surface on the object side. This reduces variation in lateral chromatic aberration during zooming.

The second lens unit L2 includes a negative lens having a convex surface on the image side, a biconcave negative lens, and a positive lens having a convex surface on the object side, and all of the lenses are spherical. This reduces aberration variation during zooming, and facilitates production so as to improve mass productivity. Further, the second lens unit L2 includes at least two negative lenses. In this case, unlike the case in which the second lens unit L2 having a negative refractive power as a whole includes only one negative lens, the negative refractive power does not concentrate on one negative lens, the radius of curvature of the lens surface does not become too small, curvature of field does not increase, and aberration variation during zooming does not increase.

The third lens unit L3 includes two positive lenses and one negative lens. This reduces longitudinal aberration, and suppresses variation in coma aberration during zooming. Further, the third lens unit L3 includes two positive lenses. Hence, unlike the case in which the third lens unit L3 having a positive refractive power as a whole includes only one positive lens, the positive refractive power does not concentrate on one positive lens, the radius of curvature of the lens surface does not become too small, and coma aberration does not increase. In addition, since the third lens unit L3 has an aspherical surface, it effectively corrects spherical aberration and coma aberration.

The fourth lens unit L4 having a positive refractive power in the first and third embodiments and the fifth lens unit L5 having a positive refractive power in the second embodiment are focusing lens units each formed by one positive lens or a cemented lens of a positive lens and a negative lens. This structure reduces the weight of the lens unit that moves for focusing, and thereby allows quick focusing.

The fourth lens unit L4 having a negative refractive power in the second embodiment is formed by one negative lens. When the fourth lens unit L4 is provided, the moving lens units are located apart from the stop SP so as to correct variation in lateral chromatic aberration and coma aberration due to zooming.

By forming the lens units, as described above, a shorter total lens length and a higher zoom ratio (higher magnification) are achieved, and a high optical performance is obtained over the entire zoom range from the wide angle end to the telephoto end.

According to the embodiments, it is possible to obtain a compact zoom lens having a high zoom ratio of 10 or more and a high optical performance over the entire zoom range.

First to third numerical examples corresponding to the first to third embodiments of the present invention will now be described. In the numerical examples, i represents the order number of the optical surface from the object side, ri represents the radius of curvature of the i-th optical surface (i-th surface), di represents the gap between the i-th surface and the i+1-th surface, and ndi and vdi respectively represent the refractive index and the Abbe number of the material of the i-th optical member for the d-line.

While the value of D12 is negative in the first numerical example, this is because the f-number determining member SP and the lens G31 of the third lens unit L3 are counted in order from the object side. More specifically, the f-number determining member (aperture stop) SP is located closer to the image side by the absolute value D12 than the object-side vertex of the lens surface of the object-side lens G31 of the third lens unit L3.

When the lens surface is aspherical, the radius of curvature thereof is marked with "*". The aspherical shape is given by the following expression:

$$x = (h^2/R)/[1+[1-(1+k)(h/R)^2]^{1/2}] + Bh^4 + Ch^6 + Dh^8 + Eh^{10}$$

where k represents the eccentricity, B, C, D, and E are aspherical coefficients, and x represents the displacement in the optical axis direction at a height h from the optical axis with reference to the vertex of the surface. In the above expression, R represents the paraxial radius of curvature. For example, "E-Z" means "$\times 10^{-z}$".

In the numerical examples, the last two surfaces are surfaces of the optical block such as a filter or a face plate. In the examples, a back focus BF represents the air conversion distance from the final lens surface to the paraxial image plane. The total lens length is the sum of the distance from the first lens surface closest to the object side to the final lens surface, and the back focus. In other words, the total lens length is the distance from the first lens surface to the image plane. In the first numerical example, and r12 represents the aperture stop SP, r19 represents the flare cut stop FP. In the second numerical example, r12 represents the aperture stop SP, and r19 represents the flare cut stop FP. In the third numerical example, r14 represents the aperture top SP. The relationships between the above-described conditional expressions and the numerical examples are shown in Table 1.

FIRST NUMERICAL EXAMPLE

Unit: mm

Surface Data

| Surface No. | r | d | nd | vd |
|---|---|---|---|---|
| 1 | 58.439 | 1.20 | 1.84666 | 23.9 |
| 2 | 32.907 | 4.00 | 1.51633 | 64.2 |
| 3 | −167.445 | 0.20 | | |
| 4 | 27.301 | 2.70 | 1.58313 | 59.4 |
| 5 | 100.035 | (variable) | | |
| 6 | 256.527 | 1.00 | 1.88300 | 40.8 |
| 7 | 7.841 | 3.00 | | |
| 8 | −623.051 | 0.50 | 1.71300 | 53.9 |
| 9 | 21.770 | 0.30 | | |
| 10 | 11.119 | 1.70 | 1.92286 | 18.9 |
| 11 | 19.586 | (variable) | | |
| 12 (stop) | ∞ | −0.30 | | |
| 13* | 8.112 | 2.30 | 1.58313 | 59.4 |
| 14 | −38.762 | 3.00 | | |
| 15 | 14.902 | 0.50 | 1.84666 | 23.9 |
| 16 | 6.729 | 0.90 | | |

-continued

| | | | | |
|---|---|---|---|---|
| 17 | 23.425 | 1.30 | 1.51633 | 64.1 |
| 18 | 566.319 | 1.00 | | |
| 19 | ∞ | (variable) | | |
| 20 | 14.190 | 2.20 | 1.48749 | 70.2 |
| 21 | −116.898 | (variable) | | |
| 22 | ∞ | 1.00 | 1.49831 | 65.1 |
| 23 | ∞ | 0.50 | | |
| Image Plane | ∞ | | | |

Aspherical Surface Data
Thirteenth Surface

K = −9.09166E−001   B = −4.31754E−005   C = 3.48961E−007
D = 1.04721E−008

Various Data
Zoom ratio 11.99

| | | | | | |
|---|---|---|---|---|---|
| Focal length | 6.00 | 23.98 | 71.98 | 44.18 | 12.04 |
| F-number | 3.60 | 4.42 | 4.94 | 4.65 | 3.99 |
| Angle of view | 31.02 | 9.18 | 3.08 | 5.01 | 17.84 |
| Image height | 3.61 | 3.88 | 3.88 | 3.88 | 3.88 |
| Total lens length | 68.75 | 68.89 | 75.26 | 72.37 | 66.75 |
| BF | 8.29 | 15.01 | 9.14 | 15.33 | 11.72 |
| d5 | 0.60 | 15.79 | 25.62 | 21.74 | 8.59 |
| d11 | 29.74 | 8.98 | 1.04 | 3.84 | 17.00 |
| d19 | 4.62 | 3.62 | 13.95 | 5.95 | 3.94 |
| d21 | 7.12 | 13.84 | 7.97 | 14.16 | 10.55 |

Zoom Lens Unit Data

| Unit | First Surface | Focal Length |
|---|---|---|
| 1 | 1 | 43.44 |
| 2 | 6 | −9.42 |
| 3 | 12 | 17.43 |
| 4 | 20 | 26.10 |
| 5 | 22 | ∞ |

SECOND NUMERICAL EXAMPLE

Unit: mm
Surface Data

| Surface No. | r | d | nd | vd |
|---|---|---|---|---|
| 1 | 39.323 | 1.20 | 1.84666 | 23.9 |
| 2 | 22.950 | 4.50 | 1.69680 | 55.5 |
| 3 | 166.497 | 0.20 | | |
| 4 | 31.714 | 2.50 | 1.71300 | 53.9 |
| 5 | 93.247 | (variable) | | |
| 6 | −559.441 | 1.00 | 1.83400 | 37.2 |
| 7 | 6.763 | 2.90 | | |
| 8 | −24.286 | 0.60 | 1.77250 | 49.6 |
| 9 | 19.578 | 0.20 | | |
| 10 | 12.694 | 1.90 | 1.92286 | 18.9 |
| 11 | 79.126 | (variable) | | |
| 12 (stop) | ∞ | 1.75 | | |
| 13* | 8.842 | 1.90 | 1.58313 | 59.4 |
| 14 | −48.359 | 4.00 | | |
| 15 | 28.901 | 0.50 | 1.84666 | 23.9 |
| 16 | 8.059 | 0.30 | | |
| 17 | 16.070 | 1.40 | 1.51633 | 64.1 |
| 18 | −35.157 | 1.00 | | |
| 19 | 00 | (variable) | | |
| 20 | −64.639 | 0.55 | 1.48749 | 70.2 |
| 21 | −247.351 | (variable) | | |
| 22 | 13.891 | 2.00 | 1.60311 | 60.6 |
| 23 | −1228.224 | (variable) | | |
| 24 | ∞ | 1.00 | 1.49831 | 65.1 |
| 25 | ∞ | 0.50 | | |
| Image Plane | ∞ | | | |

-continued

Aspherical Surface Data
Thirteenth Surface

K = −8.24140E−001   B = −4.18452E−005   C = −3.86514E−007
D = 2.43674E−008

Various Data
Zoom ratio 12.51

| | | | | | |
|---|---|---|---|---|---|
| Focal length | 5.52 | 21.79 | 69.10 | 39.94 | 11.27 |
| F-number | 3.60 | 4.39 | 4.66 | 4.48 | 4.06 |
| Angle of view | 32.36 | 10.08 | 3.21 | 5.54 | 18.98 |
| Image height | 3.50 | 3.88 | 3.88 | 3.88 | 3.88 |
| Total lens length | 65.46 | 70.42 | 76.89 | 74.15 | 67.00 |
| BF | 9.53 | 15.87 | 9.60 | 15.67 | 12.86 |
| d5 | 0.60 | 14.78 | 23.86 | 20.28 | 8.10 |
| d11 | 22.86 | 7.16 | 2.00 | 3.74 | 12.95 |
| d19 | 1.84 | 2.13 | 2.82 | 2.50 | 1.90 |
| d21 | 2.23 | 2.09 | 10.22 | 3.56 | 2.80 |
| d23 | 8.36 | 14.70 | 8.43 | 14.50 | 11.69 |

Zoom Lens Unit Data

| Unit | First Surface | Focal Length |
|---|---|---|
| 1 | 1 | 39.22 |
| 2 | 6 | −7.34 |
| 3 | 12 | 16.77 |
| 4 | 20 | −179.68 |
| 5 | 22 | 22.79 |
| 6 | 24 | ∞ |

THIRD NUMERICAL EXAMPLE

Unit: mm
Surface Data

| Surface No | r | d | nd | vd |
|---|---|---|---|---|
| 1 | 84.274 | 2.00 | 1.80610 | 33.3 |
| 2 | 32.475 | 6.20 | 1.49700 | 81.5 |
| 3 | −431.509 | 0.20 | | |
| 4 | 33.415 | 3.60 | 1.69680 | 55.5 |
| 5 | 180.027 | (variable) | | |
| 6 | 64.172 | 1.00 | 1.88300 | 40.8 |
| 7 | 11.733 | 1.90 | | |
| 8 | 29.308 | 0.85 | 1.83481 | 42.7 |
| 9 | 9.447 | 3.30 | | |
| 10 | −36.240 | 0.80 | 1.83400 | 37.2 |
| 11 | 57.884 | 0.20 | | |
| 12 | 19.186 | 2.25 | 1.92286 | 18.9 |
| 13 | −416.054 | (variable) | | |
| 14 (stop) | ∞ | (variable) | | |
| 15* | 12.148 | 3.00 | 1.69350 | 53.2 |
| 16 | 847.526 | 3.00 | | |
| 17 | 63.798 | 0.90 | 1.64769 | 33.8 |
| 18 | 14.183 | 0.50 | | |
| 19 | 27.624 | 0.70 | 2.00330 | 28.3 |
| 20 | 8.242 | 2.40 | 1.74400 | 44.8 |
| 21 | −47.263 | (variable) | | |
| 22 | 20.094 | 2.70 | 1.77250 | 49.6 |
| 23 | −15.105 | 0.60 | 1.80610 | 33.3 |
| 24 | 286.339 | (variable) | | |
| 25 | ∞ | 1.00 | 1.51633 | 64.1 |
| 26 | ∞ | 0.50 | | |
| Image plane | ∞ | | | |

Aspherical Surface Data
Fifteenth Surface

K = 1.62671E+000   B = −1.65451E−004   C = −1.30791E−006
D = −2.64512E−008   E = −5.84379E−010

-continued

Various Data
Zoom ratio 19.04

| Focal length | 5.15 | 20.12 | 98.07 | 7.10 | 40.03 |
|---|---|---|---|---|---|
| F-number | 2.87 | 4.33 | 5.63 | 3.19 | 4.74 |
| Angle of view | 36.89 | 10.87 | 2.26 | 28.58 | 5.51 |
| Image height | 3.88 | 3.88 | 3.88 | 3.88 | 3.88 |
| Total lens length | 89.11 | 96.12 | 110.38 | 85.99 | 104.08 |
| BF | 10.82 | 16.84 | 8.24 | 11.75 | 18.46 |
| d5 | 0.90 | 18.38 | 36.34 | 2.98 | 28.34 |
| d13 | 24.19 | 8.52 | 1.70 | 17.48 | 4.76 |
| d14 | 11.10 | 2.55 | 0.90 | 8.92 | 0.90 |
| d21 | 6.00 | 13.74 | 27.11 | 8.75 | 15.53 |
| d24 | 9.66 | 15.68 | 7.08 | 10.59 | 17.30 |

Zoom Lens Unit Data

| Unit | First Surface | Focal Length |
|---|---|---|
| 1 | 1 | 54.78 |
| 2 | 6 | −9.63 |
| 3 | 14 | ∞ |
| 4 | 15 | 21.96 |
| 5 | 22 | 29.64 |
| 6 | 25 | ∞ |

TABLE 1

| Conditional Expression | First Example | Second Example | Third Example |
|---|---|---|---|
| (1) $(\beta 2t \times \beta 3w)/(\beta 2w \times \beta 3t)$ | 3.269 | 5.360 | 4.511 |
| (2) M3/Lt | −0.135 | −0.116 | −0.194 |
| (3) M1/Lw | −0.094 | −0.173 | −0.270 |
| (4) Lw/fw | 11.506 | 11.912 | 17.430 |

Next, a description will be given of an example of a digital still camera using the zoom lens of the embodiments as an imaging optical system, with reference to FIG. 7. Referring to FIG. 7, the digital still camera includes a camera body 20, an imaging optical system 21 formed by the zoom lens of any of the first to third embodiments, a solid-state image pickup element (photoelectric conversion element) 22, such as a CCD sensor or a CMOS sensor, incorporated in the camera body 20 so as to receive an object image formed by the imaging optical system 21, a memory 23 for recording information about the object image photoelectrically converted by the image pickup element 22, and a finder 24 formed by a liquid crystal display panel or the like. The object image formed on the solid-state image pickup element 22 is viewed through the finder 24. By thus applying the zoom lens of the present invention to an image pickup apparatus such as a digital still camera, the image pickup apparatus can have a compact size and a high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-180539 filed Aug. 3, 2009, which is hereby incorporated by reference herein in its entirety.

What is claimed is:

1. A zoom lens comprising:
a first lens unit having a positive refractive power;
a second lens unit having a negative refractive power;
a third lens unit having a positive refractive power; and
a rear group including at least one lens unit,
wherein the first lens unit, the second lens unit, the third lens unit, and the rear group are arranged in order from an object side to an image side,
wherein the second lens unit and the third lens unit move for zooming, and
wherein the following conditions are satisfied:

$$3.00 < (\beta 2t \times \beta 3w)/(\beta 2w \times \beta 3t) < 5.85$$

$$-0.50 < M3/Lt < -0.10$$

where β2w and β2t represent imaging magnifications of the second lens unit at a wide angle end and a telephoto end, β3w and β3t represent imaging magnifications of the third lens unit at the wide angle end and the telephoto end, M3 represents a moving amount of the third lens unit along an optical axis during zooming from the wide angle end to the telephoto end, and Lt represents a total lens length of the zoom lens at the telephoto end.

2. The zoom lens according to claim 1, wherein the following condition is satisfied:

$$-0.3 < M1/Lw < -0.05$$

where M1 represents a moving amount of the first lens unit along the optical axis during zooming from the wide angle end to the telephoto end, and Lw represents a total lens length of the zoom lens at the wide angle end.

3. The zoom lens according to claim 1, wherein the following condition is satisfied:

$$7.0 < Lw/fw < 14.0$$

where fw represents a focal length of the entire zoom lens at the wide angle end, and Lw represents a total lens length of the zoom lens at the wide angle end.

4. The zoom lens according to claim 1,
wherein a lens closest to the object side in the third lens unit has a convex lens surface on the object side, and
wherein an f-number determining stop configured to determine an open f-number light beam is provided between an object-side vertex of the lens and an intersection of the object-side lens surface and an outer peripheral portion of the lens.

5. The zoom lens according to claim 1, wherein the first lens unit is formed by three lenses.

6. The zoom lens according to claim 1, wherein all lens surfaces included in the second lens unit are spherical.

7. The zoom lens according to claim 1, wherein the third lens unit includes at least one aspherical lens surface.

8. The zoom lens according to claim 1, wherein the third lens unit shifts an imaging position by moving in a manner such as to have a component in a direction perpendicular to the optical axis.

9. The zoom lens according to claim 1, wherein the rear group is formed by a fourth lens unit having a positive refractive power, and
wherein the first, second, third, and fourth lens units move for zooming.

10. The zoom lens according to claim 1,
wherein the rear group is formed by a fourth lens unit having a negative refractive power and a fifth lens unit having a positive refractive power, and the fourth lens unit and the fifth lens unit are arranged in order from the object side to the image side, and wherein the first, second, third, fourth, and fifth lens units move for zooming.

11. The zoom lens according to claim 1, wherein the zoom lens forms an image in a solid-state image pickup element.

12. An image pickup apparatus comprising a zoom lens, wherein the zoom lens includes:
   a first lens unit having a positive refractive power;
   a second lens unit having a negative refractive power;
   a third lens unit having a positive refractive power; and
   a rear group including at least one lens unit,
   wherein the first lens unit, the second lens unit, the third lens unit, and the rear group are arranged in order from an object side to an image side,
   wherein the second lens unit and the third lens unit move for zooming, and
   wherein the following conditions are satisfied:

$$3.00 < (\beta 2t \times \beta 3w)/(\beta 2w \times \beta 3t) < 5.85$$

$$-0.50 < M3/Lt < -0.10$$

where $\beta 2w$ and $\beta 2t$ represent imaging magnifications of the second lens unit at a wide angle end and a telephoto end, $\beta 3w$ and $\beta 3t$ represent imaging magnifications of the third lens unit at the wide angle end and the telephoto end, M3 represents a moving amount of the third lens unit along an optical axis during zooming from the wide angle end to the telephoto end, and Lt represents a total lens length of the zoom lens at the telephoto end.

13. The image pickup apparatus according to claim 12, wherein an effective image circle diameter is smaller at the wide angle end than at the telephoto end.

* * * * *